Figure 1:
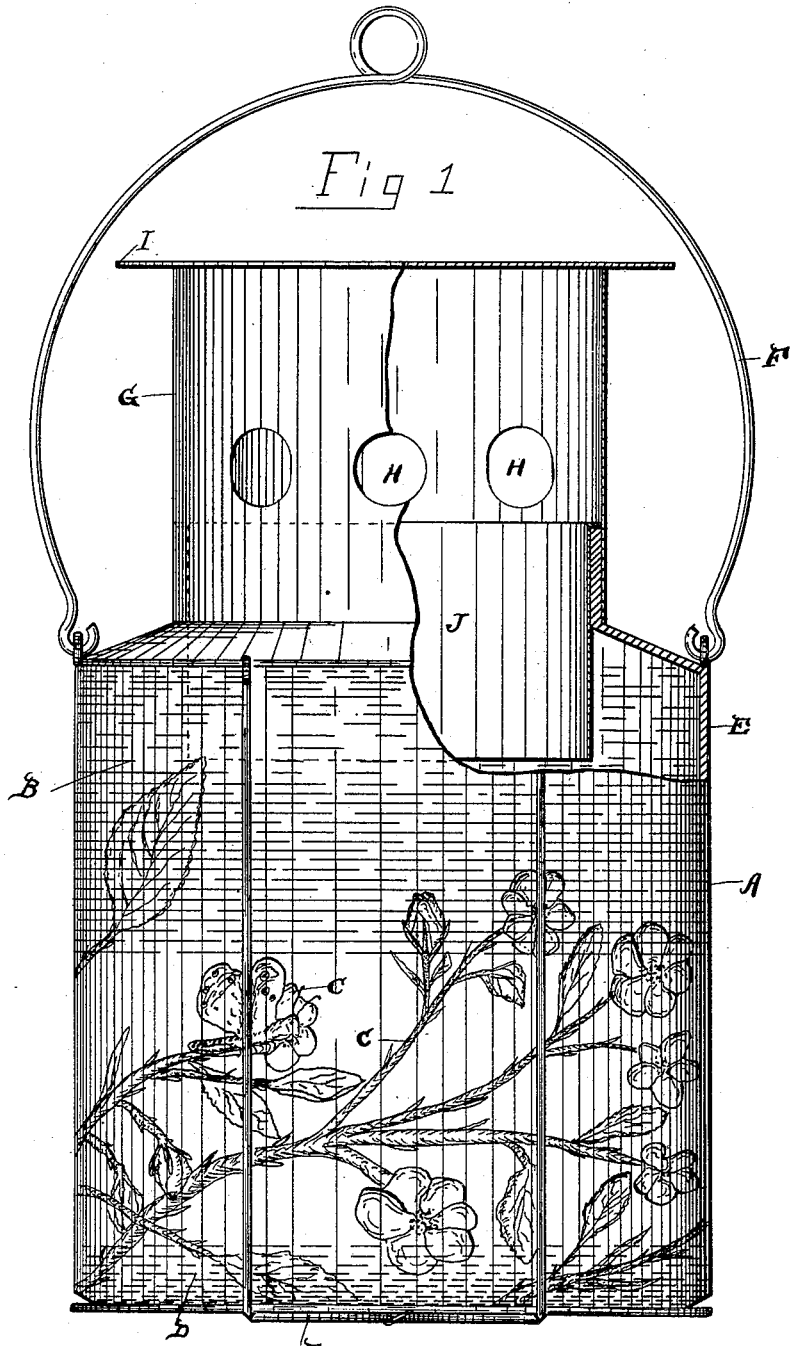

(Model.)

2 Sheets—Sheet 1.

W. C. BARNARD.
MOTH TRAP.

No. 420,490.

Patented Feb. 4, 1890.

WITNESSES
F. A. Cutter.
Walter S. Brown.

INVENTOR
W. C. Barnard
By Attys

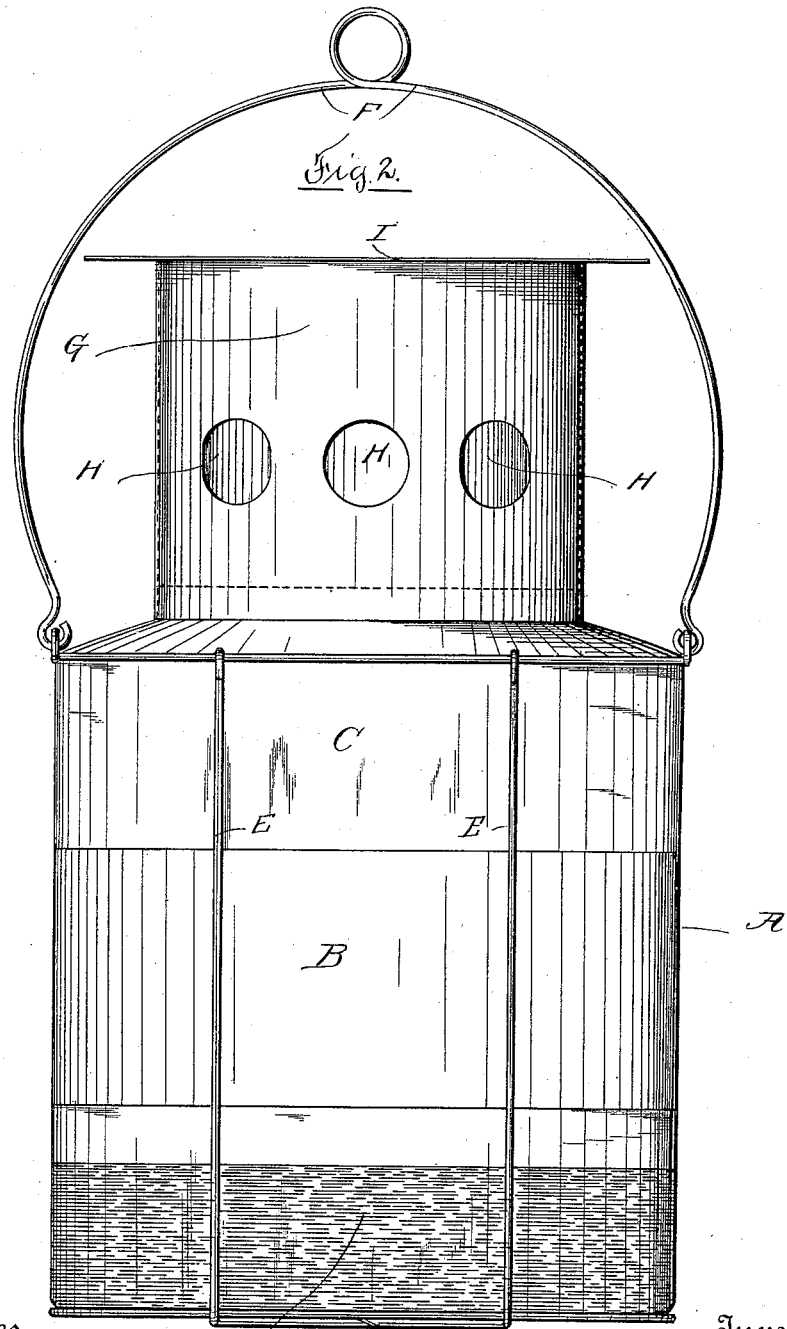

UNITED STATES PATENT OFFICE.

WILLIAM C. BARNARD, OF WORCESTER, MASSACHUSETTS.

MOTH-TRAP.

SPECIFICATION forming part of Letters Patent No. 420,490, dated February 4, 1890.

Application filed November 16, 1889. Serial No. 330,793. (Model.)

*To all whom it may concern:*

Be it known that I, WILLIAM C. BARNARD, a citizen of the United States, residing at the city of Worcester, in the county of Worcester and Commonwealth of Massachusetts, have invented certain new and useful Improvements in Moth-Traps, of which the following, in connection with the accompanying drawings, is a specification sufficiently clear and descriptive to enable those skilled in the art to which my invention belongs to make and use the same.

The object of my invention is for the purpose of destroying the moth, the miller, and their kindred families that infest and destroy pears, plums, apples, and fruit of all kinds, and berries and vegetables, &c., also clothing, carpets, boots and shoes, dry goods, merchandise, and all kinds of woolens and furs; and it consists of a glass jar, preferably round, supported in a wire frame and having a bail, the opening or mouth of the jar being contracted a little, the rim raised and having a socket or thimble made of sheet metal set therein, which depends a little below the contracted portion forming a space between the socket and the larger portion of the jar, which prevents the insects from crawling up the inside of the jar into the top and so out of the holes of ingress. Said top is made of sheet metal, or it may be made of glass having the holes of ingress and a projecting flange to keep out the rain which sets over the top of the jar like a snug cover, and may be taken off and the socket or thimble taken out to put in bait or to empty the contents and insects, as the occasion may require. A portion of the outside of the jar is provided with a coat of luminous paint, and bright colors are placed below the same. The bright colors represent flowers, leaves, &c. The bait consists of honey, one part; balm, two parts; lavender, one part; grape-wine, two parts, and cider, four parts, which is deposited inside the trap.

Referring to the drawings, Figure 1 represents a view in elevation of my trap, a portion being cut away at the top of the jaw and showing the projection of the socket or thimble set therein. Fig. 2 is a modification thereof from which the bright colors have been omitted.

A denotes the jar, made of glass, preferably round, and of suitable size; B, the luminous paint and bright colors representing flowers, leaves, &c.

D denotes the bait, food, or attractor inside, and E E the wire frame, and F the bail.

G denotes the top or crown, having holes H of ingress, and I the projecting flange, which keeps out the rain, and also serves as a guide for the insects to enter the holes.

J denotes the socket or thimble inserted in the mouth of the jar, which serves to prevent the insects from crawling up into the top and out of the holes therein.

I am well aware that others have used bait; but after a long series of experiments I have found the above formula or combination a perfect food or attractor, and the odor far reaching in attracting the *Lepidoptera* family. I have found by experience that bright colors have a wonderful attraction when placed in connection with the luminous paints in the night.

The great advantage in the application of the luminous paint is that there are no lamps to fill, it being in readiness without any further attention as to lighting.

Having thus fully described my invention, what I claim, and desire to secure by Letters Patent, is—

1. A moth-trap consisting of a glass jar of any desired capacity having a luminous paint covering a portion of its circumference and figures, as flowers or the like, in bright colors on the other portion thereof to serve as an attractor for insects, a wire supporting-frame for said jar, and a cap-piece having openings therein for the entrance of moths, substantially as described.

2. A moth-trap consisting of a glass jar having luminous paint and bright colors on the cylindrical portion thereof, a wire frame surrounding said jar, a bail secured to said frame, an annular flange depending from the mouth of said jar into the interior thereof, a cap with openings therein for the admission of moths, and an aromatic bait therein, substantially as described.

WILLIAM C. BARNARD.

In presence of—
WILLIAM P. SIBLEY,
FRED. D. SIBLEY.